United States Patent [19]

Sas-Jaworsky

[11] Patent Number: 5,285,204
[45] Date of Patent: Feb. 8, 1994

[54] COIL TUBING STRING AND DOWNHOLE GENERATOR

[75] Inventor: Alex Sas-Jaworsky, Houston, Tex.

[73] Assignee: Conoco Inc., Ponca City, Okla.

[21] Appl. No.: 918,967

[22] Filed: Jul. 23, 1992

[51] Int. Cl.$^5$ .............................................. G01V 1/00
[52] U.S. Cl. .............................. 340/854.9; 340/856.1; 340/855.8; 175/40; 367/911
[58] Field of Search ................ 175/40, 50; 340/855.8, 340/854.9, 854.6, 856.1; 367/911, 14

[56] References Cited

U.S. PATENT DOCUMENTS

| | | | |
|---|---|---|---|
| Re. 30,246 | 4/1980 | Richter, Jr. et al. | 175/65 |
| 4,147,223 | 4/1979 | Patton | 175/40 |
| 4,256,146 | 3/1981 | Genini et al. | 138/111 |
| 4,336,415 | 7/1982 | Walling | 166/77 |
| 4,515,225 | 5/1985 | Dailey | 175/40 |
| 4,532,614 | 7/1985 | Peppers | 367/81 |
| 4,570,705 | 2/1986 | Walling | 174/47 |
| 4,578,675 | 3/1986 | MacLeod | 166/66 |
| 4,866,214 | 9/1989 | Kinnan | 174/47 |
| 4,905,773 | 3/1990 | Kinnan | 175/19 |
| 4,992,787 | 2/1991 | Helm | 340/854 |
| 5,140,319 | 8/1992 | Riordan | 340/854.9 |

OTHER PUBLICATIONS

"Coiled Tubing . . . Operations and Services" by C. G. Blount/E. J. Walker–World Oil, May 1992 pp. 89–96.
"Logging on Coiled Tubing: A Proven Technique for Highly Deviated Wells & Other Applications" by M. Corrigan, C. Hoyer and C. Gaston–ADNOC/SPE pp. 50–55.
"Logging Horizontal Wells: Field Practice for Various Techniques" by A. M. Spreux, A. Louis and M. Rocca–Journal of Petroleum Technology, Oct. 1988 pp. 1352–1354.
"Logging, Completing Extended-Reach and Horizontal Wells" by S. B. Nice and W. H. Ferti–World Oil, Mar. 1991 pp. 49–56.

*Primary Examiner*—J. Woodrow Eldred
*Attorney, Agent, or Firm*—John E. Holder

[57] ABSTRACT

A borehole system for operating a downhole generator suspended on a composite coiled tubing string. The coiled tubing has at least two separate longitudinal chambers to provide separate flow paths. A fluid is pumped from the surface through one flowpath to drive a downhole turbine powered generator for operating downhole systems. A second flowpath in the tubing is used to return fluids to the surface. The non-metal environment of the composite coiled tubing provides a non-magnetic environment in which to operate wellbore devices. Data is transmitted to the surface by way of a fiber optic conductor.

19 Claims, 2 Drawing Sheets

COIL TUBING STRING AND DOWNHOLE GENERATOR

The present invention is directed to a composite coiled tubing string combined with an electrical downhole generator, to provide a system for generating electrical power downhole. The composite coiled tubing string is made of non-metallic materials. A downhole tool is operated with the electric generator and sends data signals to the surface over a non-metallic conducting path.

DESCRIPTION OF THE PRIOR ART

Background technology for the present system includes the use of downhole generators for generating electrical power for operating well tools in a drilling string. One use for such systems has been to provide for subsurface telemetry of data. These systems were developed to overcome the short comings of batteries, primarily due to downhole temperatures, and electrical power from the surface, which necessitates electrical conductors being extended from the surface to the downhole location. One of the major problems with such downhole generators concerns the abrasive effects of drilling fluids on the moving parts of the generator. Some generators are sealed in an oil bath to prevent these problems but have generated other sealing problems in the process. An elaborate scheme for insulating the moving parts of the electrical generator from drilling fluids is set forth in U.S. Pat. No. 4,532,614 which provides an insulating chamber between an impeller section of the device and the generator itself.

Electrical power generating systems energized by drilling fluids are well known in the drilling art for providing power to drill bit directional information systems. These systems collect and transmit data such as azimuth and inclination provided by downhole sensors located in the vicinity of the drill bit. Several telemetry techniques are in use for transmitting this directional information uphole. The downhole sensors usually require electrical power for their operation and such power, typically, has been provided by either batteries or mud driven turbines. Batteries generally have a relatively short life span since known devices are unable to provide sustained power delivery at the high operating temperatures that characterize conventional drilling operations. Thus the batteries require frequent replacement providing corresponding frequent and costly interruptions in drilling operations.

A mud energized data system typically includes a turbine coupled to an electrical generator for providing power to the downhole sensor. The turbine however is driven by and thus is in contact with the drilling mud. The drilling mud normally contains cuttings, debris and other abrasives which cause rapid deterioration of the turbine blades that come in contact with the mud, and contamination of bearing surfaces. Attempts have been made to place filters in the mud path to filter out some of the material from the mud. However such filters are prone to being clogged thus requiring either maintenance or replacement. The electrical or hydraulic powered generator associated with such mud driven turbines normally must be operated in a protected, clean, and pressure compensated environment, thus the generator is generally placed in a compartment isolated from the drilling mud by a rotary type seal which is prone to a rapid deterioration and failure.

Other background technology related to the present invention involves mud pulsed telemetry of data from a downhole location to the surface. U.S. Pat. No. 4,147,223 discloses such a system wherein a rotary valve downhole is operated to produce continuous pressure signals in the mud stream. An electrical motor drives the valve through a drive train response to a signal representing a data bit of measured downhole information. This in turn affects a phase shift in the pressure signal by speeding up or slowing down the rotation of the valve. The motor in the apparatus is used to affect the necessary changes in the speed of the valve to encode information into the generated signal as for example, when logging transducers sense some desired downhole condition and produce a signal representative of same. This signal is applied to the motor through controlled circuitry to control operation of the rotor and thereby encode the sensed information to the signal being produced by the valve.

All of the systems described above utilize a drill string in conjunction with such a downhole tool wherein data acquired by the downhole tool is ultimately transmitted over the drill string by way of drilling fluids in the drill string to the surface.

Another development which is taking place is the use of coiled tubing for drilling and for operating devices in a wellbore. An example of such a device in a drilling operation is shown in U.S. Pat. No. 4,866,214 which shows a surface cable for operating subsoil penetrating tools for boring under the earths surface and having provisions for electrical, hydraulic, air and water connections within the cable housing. This cable is wound on a reel at the surface and extends into the wellbore being drilled by the earth boring device. The cable includes fiberglass rods wrapped around a cooperating central steel wire. The steel wire provides for compressive force to be placed on the cable to push the boring tool through the underground formations.

A flexible production tubing is shown in U.S. Pat. No. 4,336,415 wherein a composite flexible tubing assembly is used for conveying fluids along plural flow paths within the coiled tubing assembly to convey electrical power and/or pneumatic hydraulic power to a drive motor for a downhole pump. Most of the component parts of the coiled tubing string are made of synthetic materials such as polyester, nylon and Kevlar™. A singular tubular path is provided in the core of the composite tubing with such a single pathway being surrounded by electrical conductors and a pair of hydraulic flowpaths.

Coiled tubing is also used to conduct logging operations and has been found particularly effective for use in logging highly deviated holes. Logging of deviated holes is also done with drill pipe techniques wherein a drill pipe is used to move the logging tool and the tool is displaced along the logging path by adding and removing drill pipe. The recording of data is done by means of a cable run through the pipe string. A side entry sub is used in the drill string to enable the cable to be positioned in the annulus between the drill pipe and the casing. To prevent damage to the cable in the annulus between the drill pipe and casing, the side entry sub is lowered no farther than where inclination of the hole becomes severe and the cable is protected by clamping it along the drill pipe.

Other techniques, such as the Pumpdown Stinger Technique, are used for logging deviated holes and all such commercial techniques utilize a cable extending through a pipe string. In coiled tubing logging and perforating operations cable is run into and through the coiled tubing string. Currently standard wireline cables are used to transmit signals between a downhole location and the surface. To date primary demand has been for production logging operations, requiring only a monocable. However, an increasing demand for specialized services increases the demand for signal transmission and necessitates the use of multiple transmission paths. Installation of cable in these coiled tubing strings is accomplished by hanging the pipe off in a well and dropping the cable through or alternatively by stretching out the pipe in a long straight flat location and pumping the cable through. Both of these methods are logistically difficult, so that once installed it is preferred to leave the cable in the pipe and dedicate the coiled tubing string to logging operations.

Coiled tubing logging provides an economic advantage when measurements are needed during some workover operations. It also will provide improvements when logging in difficult openhole conditions such as highly deviated holes, hot holes, and in conditions where circulation of fluids need to be maintained either during logging or as part of a logging and remedial workover operation where logging is used to check the performance of a workover operation.

The coiled tubing strings described above for use in drilling or production systems do not satisfy some of the needs in these operations. For example, there is need for conducting logging operations in a borehole wherein a logging tool is suspended upon a non-metallic tubing string which can withstand a variety of lateral forces placed on it with respect to the pushing and pulling of tools in and out of a well. Another need for such a system is that it be capable of handling data transmission to allow tools mounted at the downhole location to communicate with surface equipment and at the same time maintaining a nonmetallic non-electrical conductor environment throughout the length of the coil tubing string to eliminate magnetic influence and the presence of electrical impulses travelling up and down the composite coiled tubing from the downhole location to the surface. In addition a coiled tubing string of the structural quality described may need to provide data and signal transmission while providing multiple fluid flow paths between downhole and the surface.

It is therefore an object of the present invention to provide a new and improved composite tubing string for running logging tools into a borehole while maintaining a non-metallic composition of such tubing string.

SUMMARY OF THE INVENTION

With this and other objects in view, the present invention contemplates a borehole logging and workover system for gathering downhole data, and performing downhole operations. The system includes a downhole electrical powered generator and utilizes a spoolable coiled tubing member which is constructed of non-metallic, non-magnetic materials and is arranged so that a central symmetrical core portion extending along the longitudinal axis of the tubular member has two isolated chambers running from the surface to the downhole location, one chamber for conveying fluids downhole to operate an electrical generating device and another chamber for returning such fluids to the surface.

DESCRIPTION OF THE PREFERRED EMBODIMENT

Figure 1:
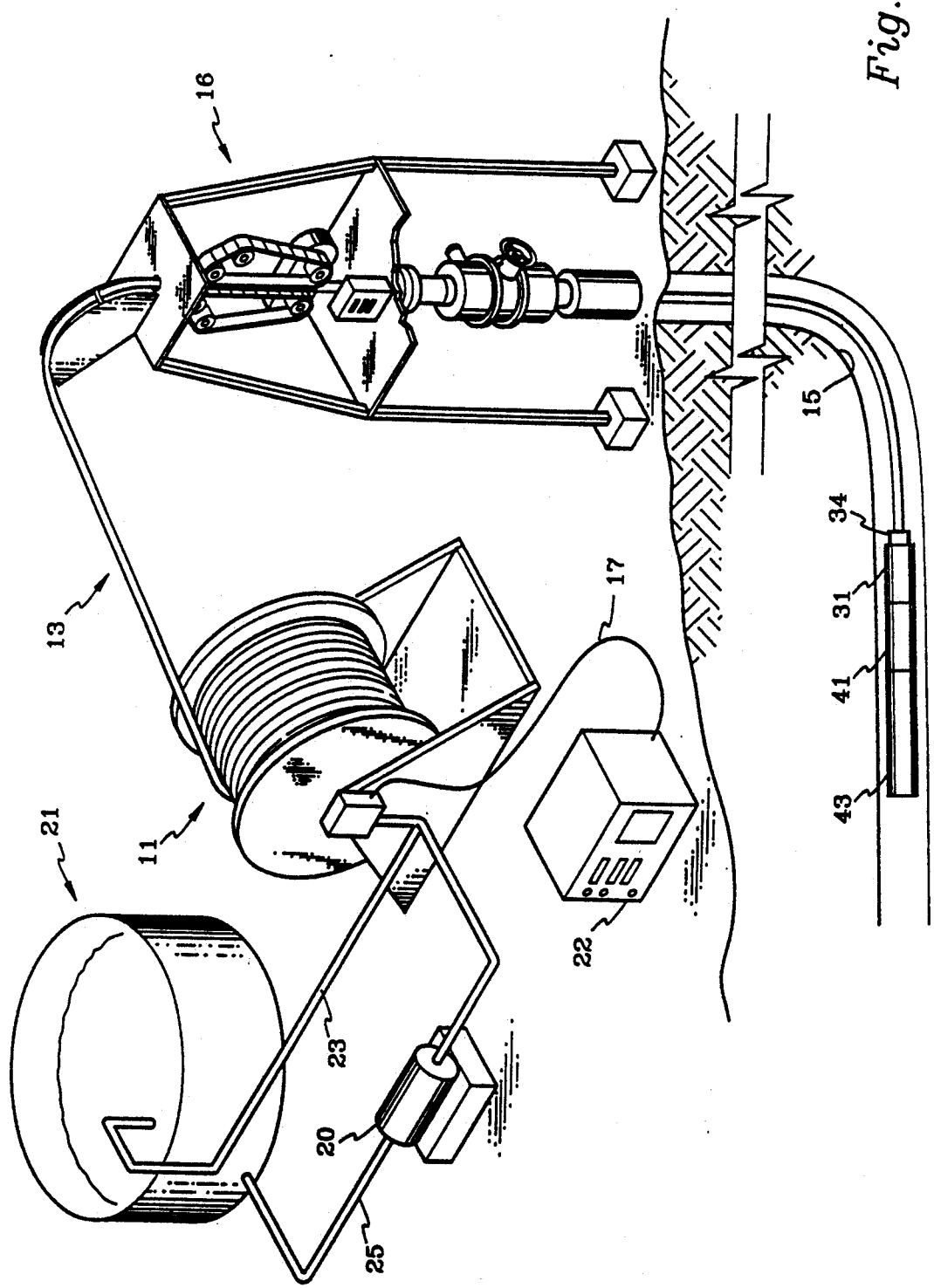
FIG. 1 is a schematic drawing showing a coiled tubing system in accordance with the present invention for positioning a tool in a borehole.
Figure 2A:
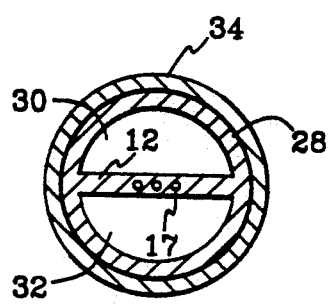
FIGS. 2A, 2B, 2C and 2D are cross sectional plan views taken along the lettered lines AA, BB, CC and DD respectively of FIG. 2.
Figure 2B:
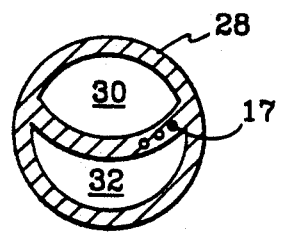

Referring first to FIG. 1 of the drawings, a borehole logging system is shown schematically having a spooling device 11 at the earths surface for storing and facilitating the reeling and unreeling of a composite coiled tubing 13 which is wound on the reel 11. A composite coiled tubing which is suitable for use in the present system is disclosed in Applicants co-pending patent application Ser. No. 804,306 entitled "Spoolable Composite Tubular Member with Integral Conductors" incorporated herein by reference. Steel coiled tubing is capable of being spooled because the steel used in the product is highly ductile and therefore capable of deformation. Spooling of such tubing for use in boreholes is commonly conducted while the tubing is under high internal pressure which introduces combined load effects. Unfortunately, repeated spooling of such metal tubing causes fatigue damage and the steel coiled tubing can fracture and fail as a result. The composite coiled tubing which is described in Applicants co-pending application Ser. No. 495,053 is designed to have a high resistance to bending stresses and internal pressures while at the same time exhibiting high axial stiffness, high tensile strength and resistance to shear stress. This provides a composite tubular member which is capable of being bent to a radius compatible with a reasonable size spool. FIG. 4 of the 495,053 application referred to above shows a composite coiled tubing similar to that contemplated for use in the present invention. Referring to FIG. 2 of the present application, the coiled tubing includes an inner core comprised of a transverse web member 12 which extends between opposite side walls of an outer cylindrical member 14 or 28 to form a two cell configuration. The outer cylindrical member 14 and web 12 are formed into a unitary structural member. Energy conductive paths 17 extend longitudinally through the web 12 of the composite cable to provide a means to transmit data from a downhole location to the surface. In the present invention this data or signal conduction path is contemplated in one embodiment as being in the form of fiber optic materials so that the overall makeup of the composite tubing member is of non-conductive and non-metallic materials.

The webb portion 12 is constructed of fibers having a zero degree of orientation with respect to the longitudinal axis of the coiled tubing member 13. The outer cylindrical or tubular member 14 will usually have an outside diameter of not more than about 2 inches and present designs are usually 1¼" to 1½" OD. The composite outer cylindrical member 14 will have a thickness of between about 0.15 and about 0.40 inches. The webb portion 12 will be between about 0.10 and about 0.25 inches thick. It may be desirable to line the interior surface of each of the isolated cells 19 and 27 formed by the webb 12 with an abrasion and chemically resistance material. The exterior surface of the composite tubular member may be protected by an abrasion resistant cover.

Referring again to FIG. 1 of the drawings, the composite tubular member described above is extended from the reel 11 into a borehole 15 which may be deviated at an angle along the borehole path as it traverses earth formations below the earths surface. The axial stiffness of the composite cable renders this cable capable of being pushed into the borehole through the deviated portion by means of a tubing injector 16 at the surface. The schematic representation of the system shown in FIG. 1 includes the composite coiled tubing described above having two separated longitudinal chambers 19, 27 (FIG. 2) therein which are used to provide separate flowpaths into and out of the coiled tubing string. In addition, the data or signal transmission paths are provided by means of the energy conducting paths 17 in the web 12. If it is desired to provide a totally non-metallic environment in the composite coiled tubing string, these energy conductive paths can be constructed with fiber optic materials.

At the lower end of the coiled tubing string, a turbine assembly 31 is comprised of an outer housing 28 having a turbine 40 rotatably mounted therein to drive an output shaft 39 which is connected to a generator shaft 46 in a generator assembly 41 therebelow. The isolated chamber 19 is connected to the inlet end of the turbine housing to provides means for transmitting fluids from the surface downhole to the turbine 40. The inlet fluids for driving the turbine are passed through the turbine and into the bottom of the turbine housing where they exit through an outlet 35 at the lower end of the housing. Outlet 35 is connected to an isolated chamber 32 to provide an outlet fluid flowpath for returning the power fluids to isolated cell 27 in the coiled tubing string for conveyance to the surface. A downhole tool 43 (FIG. 1) is shown positioned below the generator 41, such downhole tool being for the purposes of performing operations or making measurements of parameters at the downhole location. A connector 56 is provided to connect the downhole tool with the conductive path 17 located within the structure of the composite coiled tubing member as will hereinafter be described.

Referring to FIG. 1, the spooling device 11 at the surface is provided with swivel connections between the coiled tubing 13 on the reel and external flowpath lines 23 and 25 for communicating external systems with the fluid paths and data transmission paths within the coiled tubing. The present embodiment of the coiled tubing string has isolated cells forming two fluid flowpaths 27 and 19 for conducting fluids within the coiled tubing string to downhole equipment and returning such fluids to the surface. Other coiled tubing designs may be utilized so as to provide a different arrangement of plural isolated flowpaths. By means of swivel connections on the reel assembly these fluids may then be communicated with external flowlines such as flowlines 23 and 25. Flowline 23 is shown being used to return fluids from the coiled tubing to a fluid reservoir 21. Flowline 25 provides a fluid flowpath to feed fluids from the reservoir 21 to the input fluid flowpath 19 within the coiled tubing. A pump 20 may be used to pump fluids downhole through the input flowpath 19.

As for data communication, a wireline type data path may be truncated in a feed-through pressure bulkhead in the coiled tubing with the signal path 17 continuing through the reel axle and out to a collector ring. The data line usually exits through the reel axle on the opposite side from the fluid swivel but for purposes of illustration is shown in FIG. 1 on the same side as the fluid flowpaths. The data path 17 at the surface is connected to a control and data gathering component 22. In this way control signals or received data signals may be passed along the communication path 17 through the collector ring (not shown) on the reel assembly to the component 22.

Referring again to FIG. 2 of the drawings, the downhole turbine assembly 31 and generator assembly 41 are shown connected to the lower end of the coiled tubing string 13. In FIG. 2 a out-away portion of the lower end of the coiled tubing string shows the inlet fluid flowpath 19 communicating with a chamber 31 in the top portion of the turbine housing which is merely an extension of the inlet fluid path 19 of the coiled tubing string. While shown as two separate parts assembled in a connector 34, the turbine housing can be made as a unitary structure with the lower end of the coiled tubing string. The upper portion of the turbine assembly shown at FIG. 2A is divided into two symmetrical semi-hemispherical chambers 30, 32 divided by the Webb member 12 similar to the coiled tubing configuration. The outer circumference of the turbine assembly housing is defined by an outer cylindrical body 28 which is similar if not the same as outer cylindrical member 14 of the coiled tubing. A threaded connector 34 is shown connecting the upper end of the turbine assembly to the coiled tubing string. The divided chambers 30, 32 in the turbine housing migrate in structure from the top to bottom of the turbine housing.

Figure 2C:
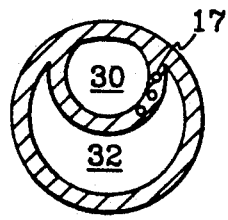

Following this migration from top to bottom in FIGS. 2A to 2D, FIG. 2B shows the webb portion 12 as starting to form into an arcuate division between the flowpath chambers 30, 32. As this division (web) progresses downwardly within the housing, it begins to form a circular division between the flowpaths as shown in FIG. 2C and ultimately in FIG. 2D forming concentrically arranged inner and outer circular flowpaths 30, 32, with spacers 33 positioned therebetween.

With this arrangement the incoming fluids into chamber 30 are moved towards the center of the housing for communication with the turbine blades 40 which are mounted on the shaft 39. Movement of fluids through the turbine blades causes the turbine shaft 39 to rotate. As the fluids pass through the turbine portion of the assembly they exit through a fluid outlet 35 at the lower end of the turbine portion wherein the fluids are communicated with the chamber 32 forming an outlet flow passage at the outer periphery of the housing in section 2D. These exiting fluids pass upwardly through the flowpath 32 for communication with outlet flowpath 27 of the coiled tubing string.

The lower end of the turbine shaft 39 is connected to a generator shaft 46 which is supported by a generator shaft support and bearing 48 and is attached to a rotor 50 within the generator assembly. The rotor 50 is rotated within a stator 52. The rotor and shaft 46 are supported on a thrust bearing 55 at the lower end of the assembly. Electrical energy which is generated within the stator windings is transmitted to a connector 56 for connection with a well tool 43 or the like positioned below the generator housing and connected thereto by means of a threaded connection 57 at the lower end of the housing. A connector 58 is provided for connecting data transmission lines in the tool 43 to the data path 17 for transmission of data through the coil tubing to the surface.

Figure 2D:
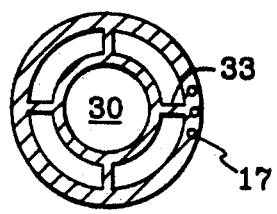
Figure 2:
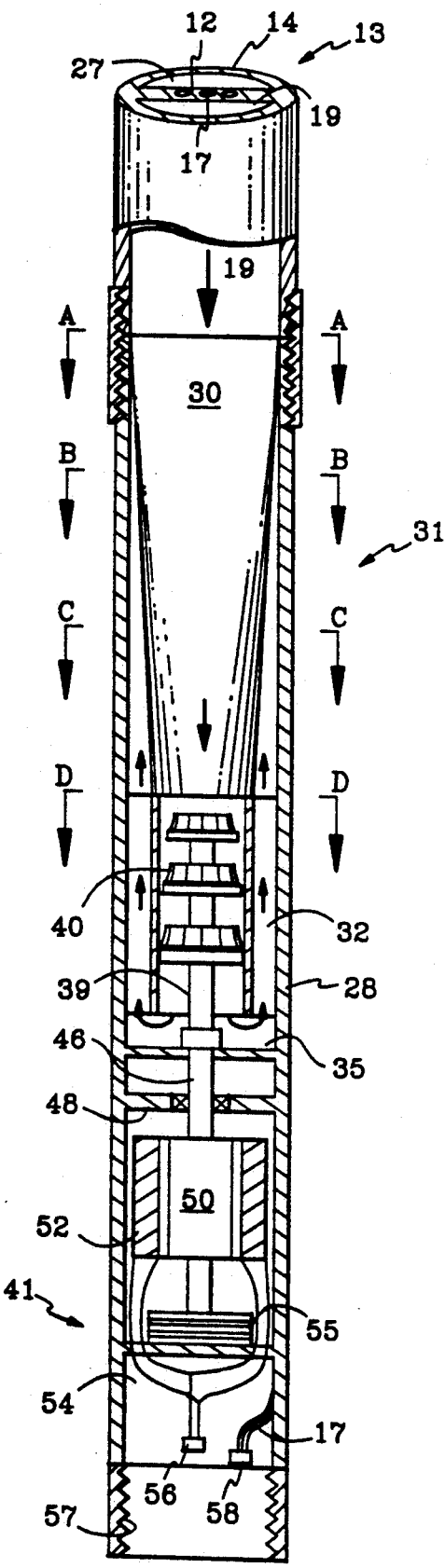
FIG. 2 is a side elevation view in cross section of a turbine and generator for use in the coiled tubing system of FIG. 1.

In the construction of the turbine section of the turbine/generator it is important to note that the fluid distribution channels are arranged so that the cross sectional area of the return fluids in the chamber 32 begin to enlarge as the cross sectional area of the power fluids flowpath in chamber 30 begins to decrease. For example, the cross sectional areas of the power and return fluid chambers in FIG. 2C is arranged so that the power fluid chamber 30 is approximately one third of the total available cross sectional area of the composite tubular housing. This ratio of cross sectional area of one third to two thirds will remain as the chamber orientation approaches that shown in FIG. 2D. In FIG. 2D the chambers are concentrically aligned to allow the power fluid to be directed into the central closed conduit 30 where the multi-tiered turbine 40 and shaft 39 are housed. The reduced cross sectional area of the power fluid conduit will effectively increase the fluid velocity of the power fluid as it is driven across the turbine blades. Below the final stage of the turbine blade assembly, exit port 35 in the lower end of the conduit connects with the return fluid path 32 thereby completing the closed loop circulating system.

It is also noted that the turbine housing shaft and blades can be constructive of composite material to further reduce the use of metal in the system construction. The avoidance of metal in the construction of the system results from the need to provide a non-metallic nonmagnetic environment in which to operate a logging tool in the borehole. The logging operations which are performed in these situations are seeking to determine parameters related to wellbore characteristics. The presence of electrical fields or magnetic fields within the system can be disruptive to the operation of or interfere with data collected in such operations. It is for this reason that the data conductive path is constructed of non-metallic materials such as fiber optic cable. A typical multiconductor electrical logging cable when carrying a high amperage current, causes an induction field to develop. Magnetic flux within the conductive wire can cause "cross-talk" where current is induced into adjacent conductor wire. Eliminating electrical conductors will solve this problem.

In addition expensive power source or electrical generating equipment at the surface is eliminated and replaced by a small positive displacement pump or the like. Also, the elimination of wireline or co-axial cables in a coiled tubing string has several advantages related to not having to deal with such add on equipment, such as the weight savings. 7/16 inch cable weighs 0.315 pounds per foot which can add up to a considerable weight savings in a 15,000 foot cable for example. In non-dedicated coiled tubing systems, it is a time consuming procedure to place the logging cable in the coiled tubing string. The service life of a coiled tubing string is enhanced by minimizing the likelihood of system failures due to broken or damaged wire and connections.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

We claim:

1. A borehole logging system for gathering downhole data and including a downhole electrical power generator, comprising:
    a unitary spoolable coiled tubing member arranged to be run into and out of the borehole and thereby selectively extended from the earths surface downhole location, said coiled tubing member comprised of nonmetallic structural materials and having a hollow centrally located core portion divided into a plurality symmetrical longitudinal cells for forming separated flow paths from the surface to the downhole location through said tubular member when extended into a wellbore; and
    generator means mounted on said coiled tubing member and operable in response to fluids being conducted through said isolated cells for generating electrical power at said downhole location.

2. The apparatus of claim 1 wherein said coiled tubing member is comprised of electrically non-conductive materials.

3. The apparatus of claim wherein said generator means has:
    a housing arranged for connection to said coiled tubing member;
    a turbine rotatably mounted in said housing;
    inlet means for directing fluids from one of said isolated cells into said turbine to rotate said turbine in said housing;
    electrical generating means connected to said turbine for rotation therewith;
    and fluid exit means for providing fluid communication with another of said isolated cells so that fluids can be moved from the earths surface down one of said cells through said turbine and then returned to the earths surface through another of said cells.

4. The apparatus of claim 2 wherein said tubular member contains an energy conducting means for transmitting data between the earth's surface and said downhole location.

5. The apparatus of claim 4 wherein said energy conducting data transmission means is comprised of fiber optic materials.

6. A method of generating electrical energy downhole in a borehole, comprising the steps of:
    placing a fluid operated electrical generating device in a composite coiled tubing string constructed of nonmetallic structural materials, said coiled tubing string having at least two longitudinal isolated cells centrally located along the axis of said tubing string to form the core of said tubing string;
    extending the coiled tubing string from the earths surface to a downhole location in a borehole;
    moving fluids from the surface through one of the isolated cells in the tubing string to the electrical generating device downhole for generating electricity at the downhole location to operate a device downhole; and
    passing fluids from the downhole generating device back to the surface through another of said isolated longitudinal cells.

7. The method of claim 6 and further including the step of generating a data signal at the downhole location; and
    passing said data signal to the surface by an energy conducting path.

8. An apparatus for providing electrical power for an electrically operated downhole device positioned in a borehole in the earth, the apparatus comprising:

spoolable tubing means having a first end at the surface and a second end extending down into the borehole and a core portion centrally positioned within said tubing means, said core portion having at least two symmetrically arranged cells isolated from one another for carrying fluid from one end of said tubing means to the other;

means for directing fluid into a first cell of said tubing means at said first end thereof;

fluid motor means attached to said second end of said tubing means for receiving the fluid from said first cell and directing the fluid into a second cell of said tubing means at said second end thereof, said fluid motor means further including a shaft mounted for rotation about its axis and means for rotating said shaft by movement of fluid in said fluid motor;

electric generating means connected to said rotatable shaft of said fluid motor means for generating electrical energy; and means for connecting a downhole electrically powered device to said electrical generating means.

9. The apparatus according to claim 8 and further including non-metallic data conducting path means for transmitting data signals from said device to the surface.

10. The apparatus according to claim 8 wherein said tubing means is formed of oriented fibers in a resin matrix body.

11. The apparatus according to claim 8 wherein said tubing means comprises a tubular member having at least one web member dividing the interior space of said tubular member into at least two cells.

12. The apparatus according to claim 11 wherein said means for rotating said rotatable shaft comprises a turbine in the path of the fluid moving from said first cell to said second cell.

13. The apparatus according to claim 8 wherein said means for directing fluid into said first cell at said first end comprises a reservoir for containing a reserve amount of the fluid, and a pump supplied with fluid from said reservoir for pumping the fluid under pressure through the tubing means, through said fluid motor means, and back up the second cell to said reservoir.

14. A method for providing electrical power for an electrically operated downhole tool positioned in a borehole in the earth, the method comprising the steps of:

inserting a composite coiled tubing string into the borehole, said coiled tubing string being constructed of non-metallic materials and having at least two longitudinal isolated cells;

directing fluid into a first cell at a first end of said coiled tubing string which extends into the borehole with its second end;

receiving the fluid from the first cell into a fluid motor at the second end of the tubing string;

rotating a shaft within the fluid motor by movement of the fluid in the fluid motor;

directing the fluid into a second cell at the second end of the tubing string to return to the first end thereof within the second cell;

generating electrical energy with an electric generator connected to the rotating shaft of the fluid motor; and conducting the electric power to the downhole tool connected to the end of the electric generator.

15. The method according to claim 14 and further including the step of maintaining a low viscosity fluid at the surface in a reservoir and circulating said fluid from said reservoir through said coiled tubing string through said first cell to said fluid motor and returning fluid from said fluid motor to the surface reservoir through said second cell.

16. The method of claim 14 and further including sending data signals form the downhole tool to the surface over a non-metallic data conducting path.

17. A coiled tubing string for running downhole tools from the earths surface into a deviated borehole to a downhole location comprising:

a continuous composite tubing member constructed of nonmetallic structural materials designed, constructed and arranged to permit compressive forces to push a downhole tool through a deviated portion of a borehole, overcoming frictional forces produced by engagement of the downhole tool and tubing member with the borehole walls, said tubing member having a plurality of symmetrical chambers forming a longitudinal core portion within said tubing member for providing isolated fluid conduits through the tubing member from the surface to the downhole location.

18. The coiled tubing string of claim 17 and further including downhole electrical generator means arranged in said tubing string for being positioned at said downhole location.

19. The coiled tubing string of claim 18 and further including downhole motive means for operating said downhole generator means, said motive means being operative in response to pumping fluid through a first of said fluid conduits to said motive means for powering said motive means and returning such fluid to the surface through another of said fluid conduits.

* * * * *

UNITED STATES PATENT AND TRADEMARK OFFICE
CERTIFICATE OF CORRECTION

PATENT NO. : 5,285,204

DATED : February 8, 1994

INVENTOR(S) : Alex Sas-Jaworsky

It is certified that error appears in the above-identified patent and that said Letters Patent is hereby corrected as shown below:

Column 6, line 15, "chamber 31" should be --chamber 30--;
Column 8, line 10, "plurality symmetrical longitudinal cells" should read --plurality of symmetrical isolated longitudinal cells--;
Column 8, line 21, after claim insert --1--;

Signed and Sealed this

Twenty-sixth Day of July, 1994

Attest:

BRUCE LEHMAN

Attesting Officer      Commissioner of Patents and Trademarks